(12) United States Patent
Murphy et al.

(10) Patent No.: US 6,201,868 B1
(45) Date of Patent: Mar. 13, 2001

(54) PORTABLE TELEPHONE HANDSET CONSTRUCTION

(75) Inventors: Paul Anthony Murphy, Tai Po (HK); Brian Douglas Smith, London (GB); Duncan Grant Young, London (GB); Nigel Timothy Court, London (GB)

(73) Assignee: Vtech Communications, Ltd. (HK)

( * ) Notice: Subject to any disclaimer, the term of this patent is extended or adjusted under 35 U.S.C. 154(b) by 0 days.

(21) Appl. No.: 09/162,305

(22) Filed: Sep. 28, 1998

(30) Foreign Application Priority Data

May 12, 1998 (GB) .................................................. 9810177

(51) Int. Cl.[7] .................................................. H04M 1/00
(52) U.S. Cl. ............................................................ 379/433
(58) Field of Search .................................. 379/433, 428, 379/451, 452, 445

(56) References Cited

U.S. PATENT DOCUMENTS 4,005,279 * 1/1977 Richter .................................. 379/445

FOREIGN PATENT DOCUMENTS

| 0 536 578 | 4/1993 | (EP) | ............................... H04M/1/02 |
| 0 536 578 A2 | 4/1993 | (EP) | ............................................ 1/2 |
| 0 414 365 B1 | 12/1996 | (EP) | ............................................ 1/2 |
| 0 846 999 | 6/1998 | (EP) | ........................................... 1/16 |
| 6-334778 | 12/1994 | (JP) . | |
| WO 97/03511 | 7/1995 | (WO) | ............................... H04M/1/02 |
| WO 97/03511 | 1/1997 | (WO) | ............................................ 1/2 |

* cited by examiner

*Primary Examiner*—Jack Chiang
(74) *Attorney, Agent, or Firm*—Dick and Harris

(57) ABSTRACT

A telephone handset construction is provided, which has a movable cover which is articulable from a closed position to an open position. The cover has a rigid portion and a flexible portion. When the cover is in the closed position, the flexible portion thereof is furled around front and top portions of the main body of the telephone handset. Upon deployment of the cover, by pulling the rigid portion of the cover in a direction away from the main body of the handset, the flexible portion of the cover is unfurled and moved to a position substantially covering the back of the main body portion of the handset.

6 Claims, 6 Drawing Sheets

PORTABLE TELEPHONE HANDSET CONSTRUCTION

BACKGROUND OF THE INVENTION

The Technical Field

The present invention is directed to portable battery-powered telephone handset constructions, in particular, those handset constructions which are articulable from a closed configuration to an open configuration.

SUMMARY OF THE INVENTION

The present invention is directed to a construction for a portable cellular telephone, though the concepts may be incorporated into virtually any portable telephone handset, which is articulable from a closed configuration to an open configuration.

In particular, the handset construction includes a movable cover, or tambour, which substantially encircles the inner workings of the handset, when the cover is in its closed configuration.

A portion of the tambour is substantially rigid, and forms a simulative microphone mouthpiece portion, though the microphone may be functional. Various controls for the telephone handset may also be located in the rigid mouthpiece portion and become exposed and functional upon deployment of the tambour.

A second portion of the tambour is substantially flexible, and is capable of furling and unfurling around the portion of the handset containing the principal inner workings of the handset. In an alternative embodiment of the invention, the tambour may be entirely flexible.

Side portions of the housing of the handset are provided with guide track structures for directing the path of movement of the tambour during the furling and unfurling movements.

When the tambour is in its closed configuration, the flexible portion substantially covers the earpiece and the portion of the main body of the handset which faces the operator during use. The rigid portion of the handset substantially covers the back of the main body of the telephone when the tambour is in its closed configuration.

In a preferred embodiment of the invention, one or more guide wheels are in operable driving/driven engagement with the tambour, in order to facilitate refurling of the tambour from the extended (open) configuration to the retracted (closed) configuration. Preferably, opening of the telephone simply involves grasping the bottom end of the rigid portion of the tambour and pulling downward, to extend the rigid portion, and cause the flexible portion to be moved to a position substantially covering the back of the main body of the telephone.

DETAILED DESCRIPTION OF THE INVENTION

Figure 1:
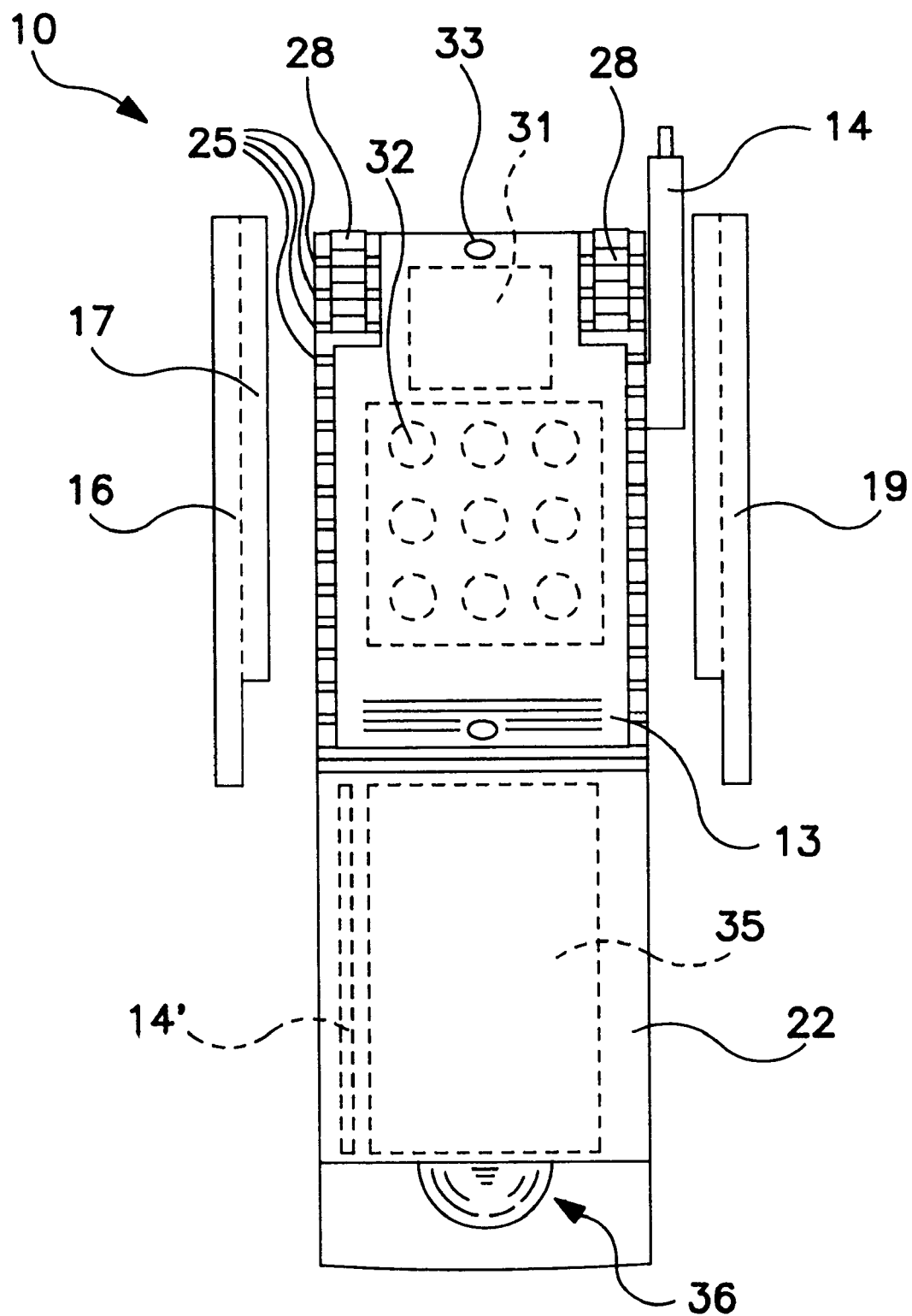
FIG. 1 is a top plan exploded view of the telephone handset construction according to one embodiment of the invention, shown in its open configuration, with the tambour extended.

While this invention is susceptible of embodiment in many different forms, there are shown in the drawings and will be described in detail herein several specific embodiments, with the understanding that the present disclosure is to be considered as an exemplification of the principles of the invention and is not intended to limit the invention to the embodiments illustrated.

Figure 2:
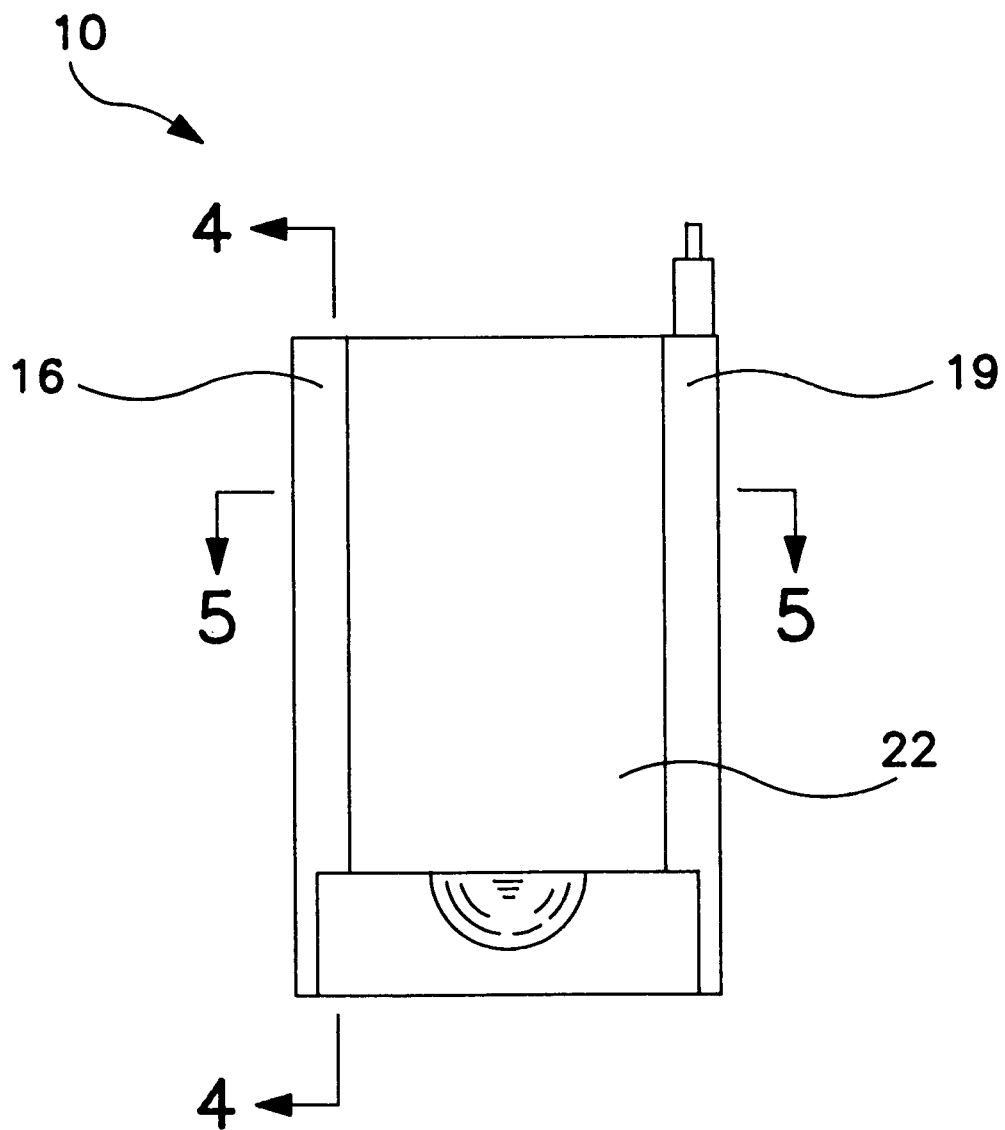
FIG. 2 shows the handset of the embodiment of FIG. 1 in its fully assembled and closed, configuration, with the tambour retracted.

Handset 10 is shown in a top plan exploded view in FIG. 1, in its open configuration. FIG. 2 shows the handset in its fully assembled and closed, configuration. Handset 10 includes main body portion 13, left side closure 16, right side closure 19, and cover or tambour 22. As shown, antenna 14 extends from the right side of the main body portion 13, but will project through a suitable notch or opening in the right side closure 19, when the handset is completely assembled, though the antenna 14 may extend from the left side 16 or other portion of the handset 10. As will be discussed elsewhere herein, while preferably, the predominance of the electronics of the telephone will be contained within the main body portion, certain components may reside partially or completely in the tambour and/or the left or right side closures.

Figure 3:
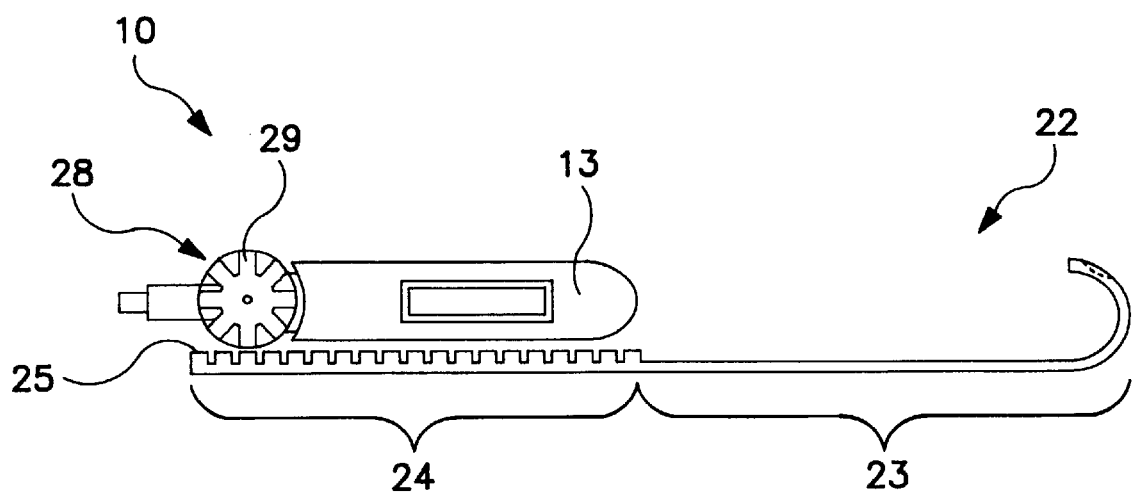
FIG. 3 illustrates a partial, schematic side elevation of the handset embodiment of FIGS. 1 and 2.
Figure 4:
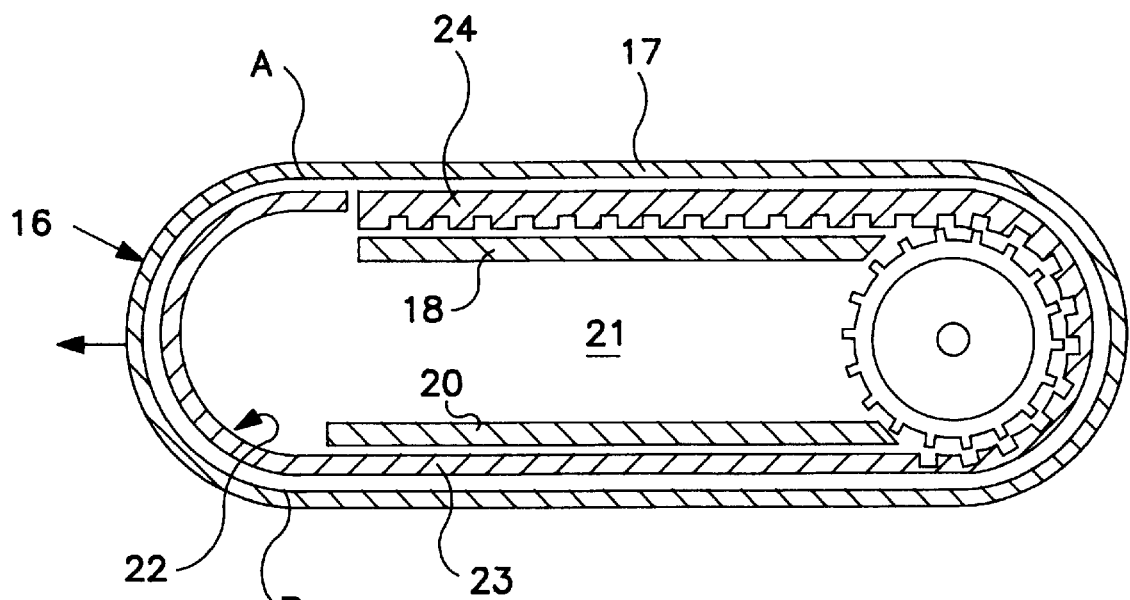
FIG. 4 is a sectional side elevation of the telephone handset of the embodiment of FIGS. 1–3, taken along line 4—4 of FIG. 2.
Figure 5:
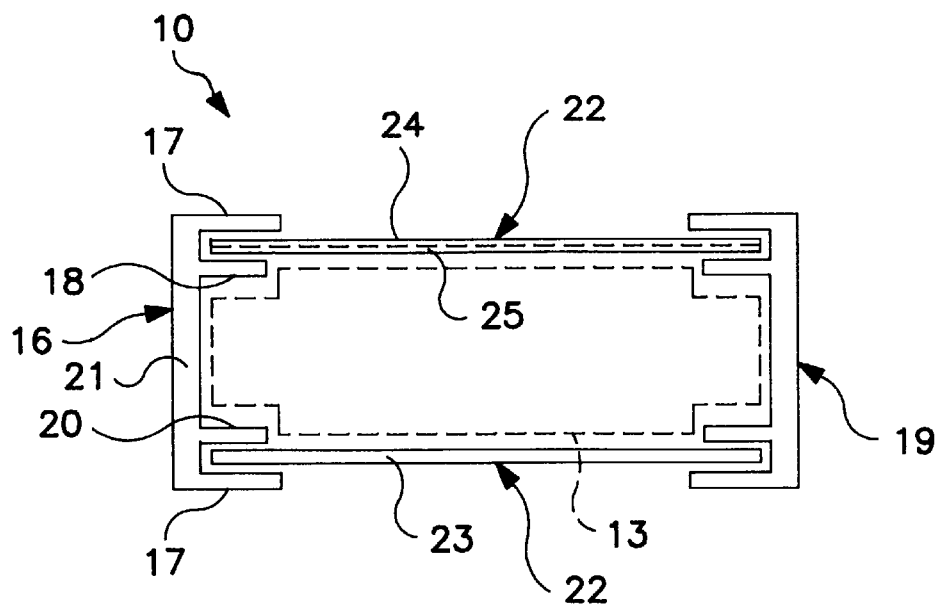
FIG. 5 is a sectional elevation of the telephone handset of the embodiment of FIGS. 1–3, taken along line 5—5 of FIG. 2.

The mechanics of the movable cover of handset 10 may be readily understood upon inspection of FIGS. 3–5.

FIG. 3 illustrates a partial side elevation of the handset embodiment of FIGS. 1 and 2. Tambour 22 is shown in its deployed orientation. Tambour 22 has a rigid portion, generally indicated by reference numeral 23, and a flexible portion 24, which is made so by the presence of transversely extending teeth/grooves 25. Main body portion 13 of handset 10 has one or more guide wheels 28, which are rotatable relative to the main body portion 13. In a preferred embodiment of the invention, two guide wheels 28 are provided, one on each side of the main body portion.

Preferably, each guide wheel 28 is configured in the form of a toothed gear, wherein the teeth 29 are sized and spaced to mate with the teeth 25 of the flexible portion 24 of tambour 22, when a portion of the flexible portion 24 is furled around the main body portion 13. The teeth on the guide wheels and the teeth of the flexible portion of the tambour are shown as being rectangular or squared; however, teeth of other configurations may be employed, so long as when the tambour is held in place against the guide wheels, by the side closures, as described herein, there is a driving/driven relationship between the tambour and the guide wheels. In an alternative embodiment, the guide wheels and the tambour may be toothless, if the guide wheels and tambour are fabricated from complementary materials which will permit a satisfactorily frictional engagement therebetween, with the tambour being held in such engagement against the guide wheels by the side closures.

Inasmuch as tambour 22 forms the cover for the handset for the top, bottom, front and rear, the total length of the tambour 22, including the arcuate length of the curved portion of the bottom end of the rigid portion 23, should approximately equal the peripheral circumference of the main body portion 13, around the contour as illustrated in FIG. 3. Alternatively, handset 10 may be constructed wherein tambour 22 omits the curved portion of the bottom end of the rigid portion 23. Left side closure 16 and right side closure 19 may be joined together with trim panel or other structure. In such alternative embodiment, rigid portion 23 would extend outward from an area below said trim piece or from an opening formed therein.

The manner in which the tambour is held in engagement with the guide wheels and guided in its movement around the main body portion is illustrated, in accordance with one embodiment of the invention, in FIGS. 4 and 5.

FIG. 4 is a sectional side elevation of the telephone handset of the embodiment of FIGS. 1–3, taken along line 4—4 of FIG. 2. As may be observed from FIG. 1, in an embodiment of the invention, tambour 22 has a width from side to side which is slightly greater than the width of main body portion 13, so that an amount of tambour 22 projects laterally from each side of main body portion 13. In order to provide a track for tambour 22 to follow, a portion of the periphery of left side closure 19 may be provided with a laterally extending outer track structure 17, extending around the periphery clockwise from point A to point B. Although particular locations for points A and B are shown in FIG. 4, it is to be understood, that as the specific contours of the overall housing may be varied by one of ordinary skill in the art having the disclosure before them, the particular locations of points A and B may be correspondingly changed as well. When suitably configured mating surfaces of left side closure 16 is attached to corresponding suitably configured mating surfaces of the main body portion 13, by any suitable method, such as adhesive, sonic welding, fasteners, etc., a portion of the lateral width of outer track structure 17 will overhang (or underhang) and enclose portions of the tambour 22.

Left side closure 16 may will also be provided with inner track structures 18 and 20, each of which likewise will project laterally, from wall 21, toward main body portion 13. The thickness of the main body portion 13 is reflected in the construction of left side closure 16, inasmuch as since track structures 16, 17 and 20 define the path of movement of tambour 22, main body portion 13 should fit substantially in the space defined by track structures 18 and 20. Right side closure 19 is also provided with corresponding configured inner track structures which likewise project laterally from the inner surface of right side closure 19 toward main body portion 13.

When the cover is to be opened, the tambour 22 will be pulled away from the bottom of the handset. With respect to FIG. 4, this means that the rigid portion 23 of tambour 22 will be pulled to the left, as indicated by the arrow. In order to enable this to occur, there is a gap between points A and B, and to the left thereof, as FIG. 4 is seen, where the outer track structure either is completely absent, or extends laterally less than that portion between points A and B, and to the right thereof, so that the outer track structure does not overlap the rigid portion of the tambour. As indicated the tambour portion 23 need not have the upward curved structure as shown in FIG. 3 and instead may be substantially flat. In such event the left side closure 16 and right side closure 19 may be joined together by a front panel structure which overlays the top of main body portion 13 and includes opening through which keypad keys may extend and a visual display may be viewed.

The engagement of guide wheel 28 with the flexible portion 24 of tambour 22 is also shown in FIG. 4.

FIG. 5 is a sectional elevation of telephone handset 10, taken along line 5—5 of FIG. 2, and looking away from the top of the handset, so that the guide wheels are not in view. FIG. 5 is shown in the configuration in which the tambour is in its closed, furled configuration. In addition, the main body portion has been illustrated in simplified form and in broken lines, and the antenna has been omitted from this drawing, for ease of illustration of this view. The overhanging and underhanging track structures 17, 18 and 20 can be seen to laterally overlap portions of the tambour 22, which, in its furled configuration, covers both the front and back of the main body portion (above and below, as seen in FIG. 5).

While the tambour 22 is illustrated in FIGS. 1–5 as having a substantially uniform thickness from one side edge to the other, and thus its outer surface is lower (or higher) than the adjacent peripheral edges of the left and right side closures, it is to be understood that, if desired, the contour of the tambour could be chosen to make the outer surface of the central (non-overlapped) region of the tambour flush with the peripheral edges of the left and right side closures.

Right side closure 19 may be provided with a substantially corresponding set of guide track structures, having suitable gaps or apertures provided therein for accommodating the antenna structure projecting from the right side of the main body portion 13, as illustrated in FIG. 1.

As previously mentioned, the guide wheels are in a driven/driving relationship with the tambour (either through interengaging teeth on the tambour and guide wheels, or through a frictional engagement of relatively smooth surfaces). Further, the guide wheels are rotatable, relative to the main body portion of the telephone handset. While the guide wheels could be connected to each other by an axle extending through the width of the main body portion, this would take up space in the interior of the main body portion which could otherwise be occupied by electronics and other elements of the functioning telephone. Alternatively, the guide wheels may be mounted rotatably on short fixed or rotatable "dead" axles emanating from or affixed to the side walls of the main body portion.

The guide wheels could be configured to be free-wheeling relative to the main body portion. This construction would not particularly effect the deployment of the tambour. Upon grasping and pulling of the rigid portion away from the main body portion, the flexible portion, in being drawn along the guide track structures would simply cause the guide wheels to rotate. However, by moving the rigid portion back toward the main body portion, to close the phone, the flexible portion may be prompted to buckle or bind and not be able to reliably drive the guide wheels.

Accordingly, it may be desirable to provide one or all of the guide wheels with a drive mechanism in order to facilitate retraction of the tambour back "into" the closed position. Many such mechanisms are known, such as ratcheting spring biasing mechanisms such as are employed in automotive and/or residential window shades. In such mechanisms, pulling the shade (or in the present invention), the tambour out is accomplished against the increasing force of a spring (usually a coil spring). A ratchet mechanism prevents the shade (tambour) from retracting, once the pulling force is released. However, once the shade (tambour) has been pulled out beyond a certain predetermined distance, the ratchet releases, and the spring will rotate the guide wheel and pull the tambour back into its furled or stowed orientation. Such mechanisms are well known, and accordingly, a detailed discussion and illustration of such a mechanism is omitted from the drawings, as being unnecessary for a complete understanding of the function of the telephone housing design.

Alternatively, pulling the tambour open may be accomplished by winding against the bias of a spring, with a ratchet mechanism to prevent a sudden rewinding of the tambour. A push button-type release mechanism such as are known in the art of auto window shades, may be provided for enabling the refurling of the tambour. The push button (e.g., button 62, the embodiment of FIG. 7) may be mounted in the side closure, but may engage a counterpart lever or pawl 64 positioned in the surface of the side of the main body portion. By putting a spring bias on the guide wheel and providing a spring loaded pawl to stop the guide wheel from retracting in a undesired manner, the tambour can be pulled out and it will stay in that position. By pressing on the release button 62, the pawl may be moved out of engagement with the guide wheel, and the wheel will be free to move under the force of the spring (not shown) to reel in the tambour. Again, such mechanisms are well known, and accordingly, a detailed discussion and illustration of such a mechanism is omitted from the drawings, as being unnecessary for a complete understanding of the function of the telephone housing design.

Other known stored-energy drive mechanisms may be used as well. In addition, as an alternative method for effecting the movement of the tambour, if internal space and power considerations permit, a powered drive mechanism, such as a servo-motor connected to the guide wheels, may be employed to extend and/or retract the tambour. Such a powered drive system could be actuated by suitable controls, the buttons for which might, for example, be positioned on the side closures, and connected to the main body unit by electrical contacts on the side closure engaging counterpart contacts on the outer side surface of the main body unit.

Figure 6:
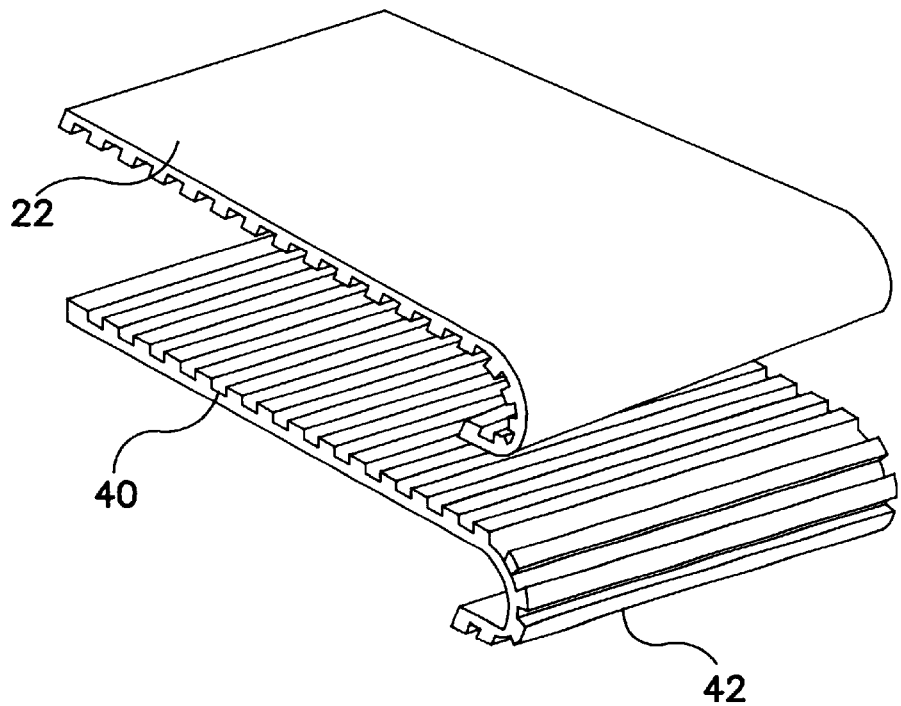
FIG. 6 are perspective views of portions of a tambour, in accordance with the embodiment of FIGS. 1—5, and a tambour having an inverted configuration, in which the "teeth" are on the outside surface and may be provided with a transversely varying contour, for decorative or gripping enhancement.

The embodiment of FIGS. 1–5 shows a slidable cover or tambour 22 (also shown in FIG. 6 for comparison purposes), in which the outer surface of the tambour is smooth, while the inner surface is provided with a toothed surface, to engage a toothed guide wheel, or alternatively a smooth surface to engage frictionally a smooth guide wheel. In an alternative embodiment of the invention, the outer surface may be provided with transverse grooves, which can be used to provide a textured gripping surface. That is, the surfaces of the teeth may have a convex or concave contour, proceeding from one side edge to the other. In the embodiment of FIG. 6, the tambour 40 is provided with such a toothed, contoured outer surface 42, but with a smooth inner surface (relying upon frictional driving engagement with the guide wheels). It may readily be understood that different combinations of smoothness or toothedness, or even knurling may be employed on either or both of the inner and outer surfaces of the tambour, by one of ordinary skill in the art, having the present disclosure before them, without departing from the scope of the invention.

Aside from the basic features described with respect to the embodiment of FIGS. 1–5, the telephone handset construction of the present invention may be modified to accommodate a variety of features. For example, the antenna structure, which extends from the side of the main body portion, may be an extendible telescoping antenna. This antenna may be extended and retracted by a central core which may be driven by a pair of suitably positioned pinch rollers, or by a ball screw or worm gear arrangement, or the like, any of which may be readily disposed in gear-driven relationship to the guide wheel on that side of the housing, such that the antenna is automatically extended when the tambour is extended. Such mechanisms generally are known and as such detailed illustrations of them have been omitted for purposes of simplifying the illustration of the present disclosure.

In an alternative to the antenna configuration 14 shown in FIGS. 1–5, to simplify the construction of the handset, the antenna may instead be embedded within the rigid portion of the tambour (reference numeral 14', FIG. 1), and connected to the main body portion by a suitable sliding electrical contact structure (not shown), or by a flexible cable ribbon between the tambour and the main body portion (not shown). By providing such a permanently embedded antenna, the need for providing a mechanism for deploying and/or retracting the antenna of the embodiments of FIGS. 1–5 is eliminated, and the handset gains the advantage of having the antenna automatically deployed, every time the handset is in use.

The telephone handset construction of FIGS. 1–5 is illustrated, for purposes of simplicity of illustration, as having a relatively simple and regular configuration, apart from the presence of the antenna. From a front elevation view, the handset has a substantially rectangular contour. From a side elevation, the handset is illustrated as having substantially straight front and back faces, and semicircular contours at its top and bottom. It is to be understood that these contours may readily be altered by one of ordinary skill in the art of telephone handset design, having the present disclosure before them, without departing from the scope of the present invention. For example, the handset configuration of FIG. 7 may be employed, which has a curved side elevation contour. The matter of providing a suitably guided tambour 50 (having a flexible portion 52 and a substantially rigid portion 54) to surround such a contour, is a matter of making sure that the tracks on the side closures substantially follow the contours of the outer surface of the handset.

Figure 7:
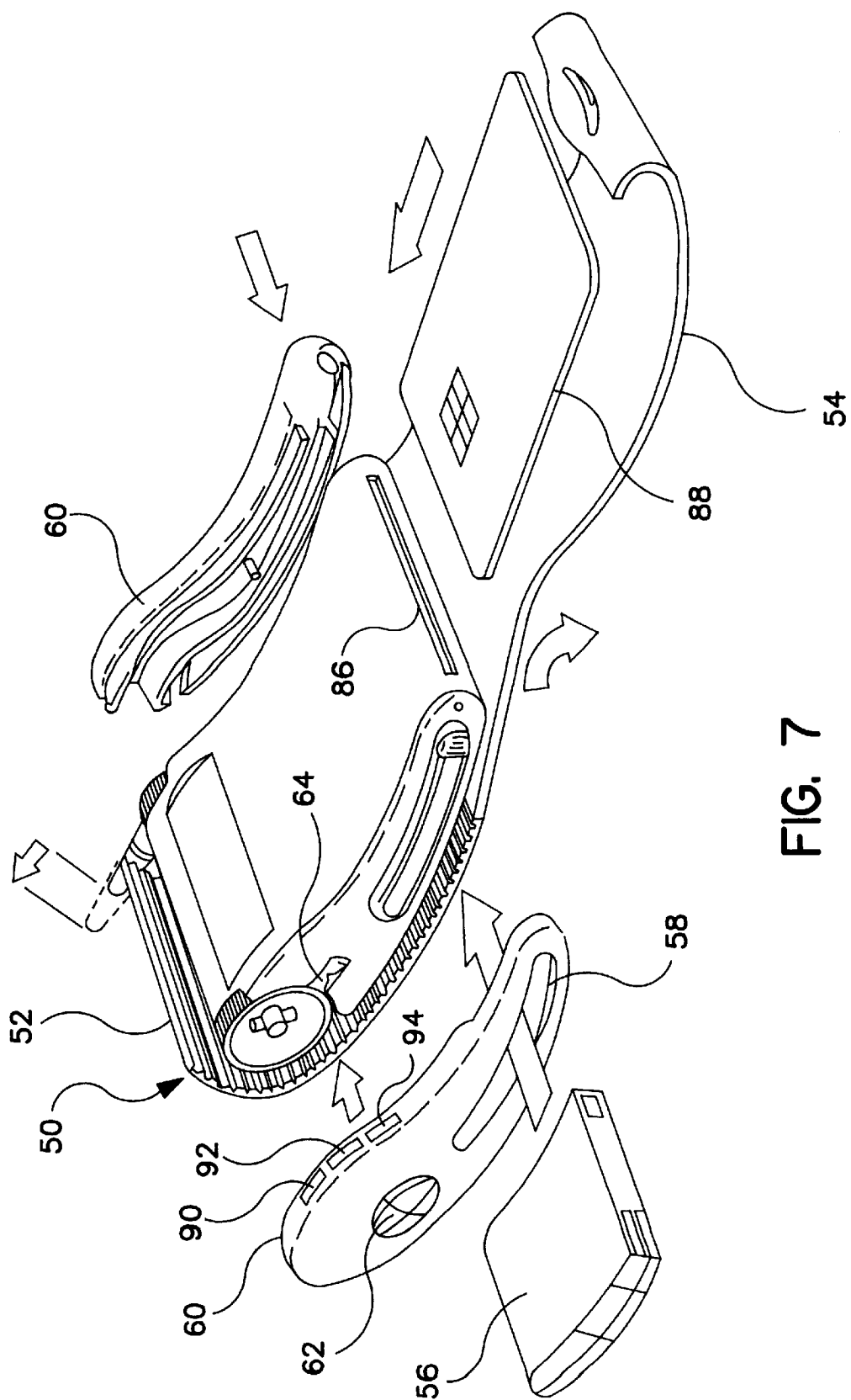
FIG. 7 is a perspective exploded view of a telephone handset construction according to an alternative embodiment of the invention, demonstrating various optional features which may be incorporated into the housing construction.

Another group of features which may be incorporated into the handset design of the present invention, relates to the battery configurations which may be employed to power the handset. Each of these schemes may be employed separately or in combination. As shown in FIG. 7, the handset may be powered by several different battery types. A first battery 56 may be insertingly received within the body of the handset. By providing a suitable aperture 58 in one or the other of the side closures 60, and providing locking and release structures (not shown) on the battery, side closure and/or main body, an operator can "pop out" a depleted battery, and then "snap in" a fresh one. Such an internally carried battery will have one or more tabbed deflectable barbed tangs which will engage a detent on the side closure or in the main body portion, to hold the battery in place, but enable its quick removal.

Figure 8:
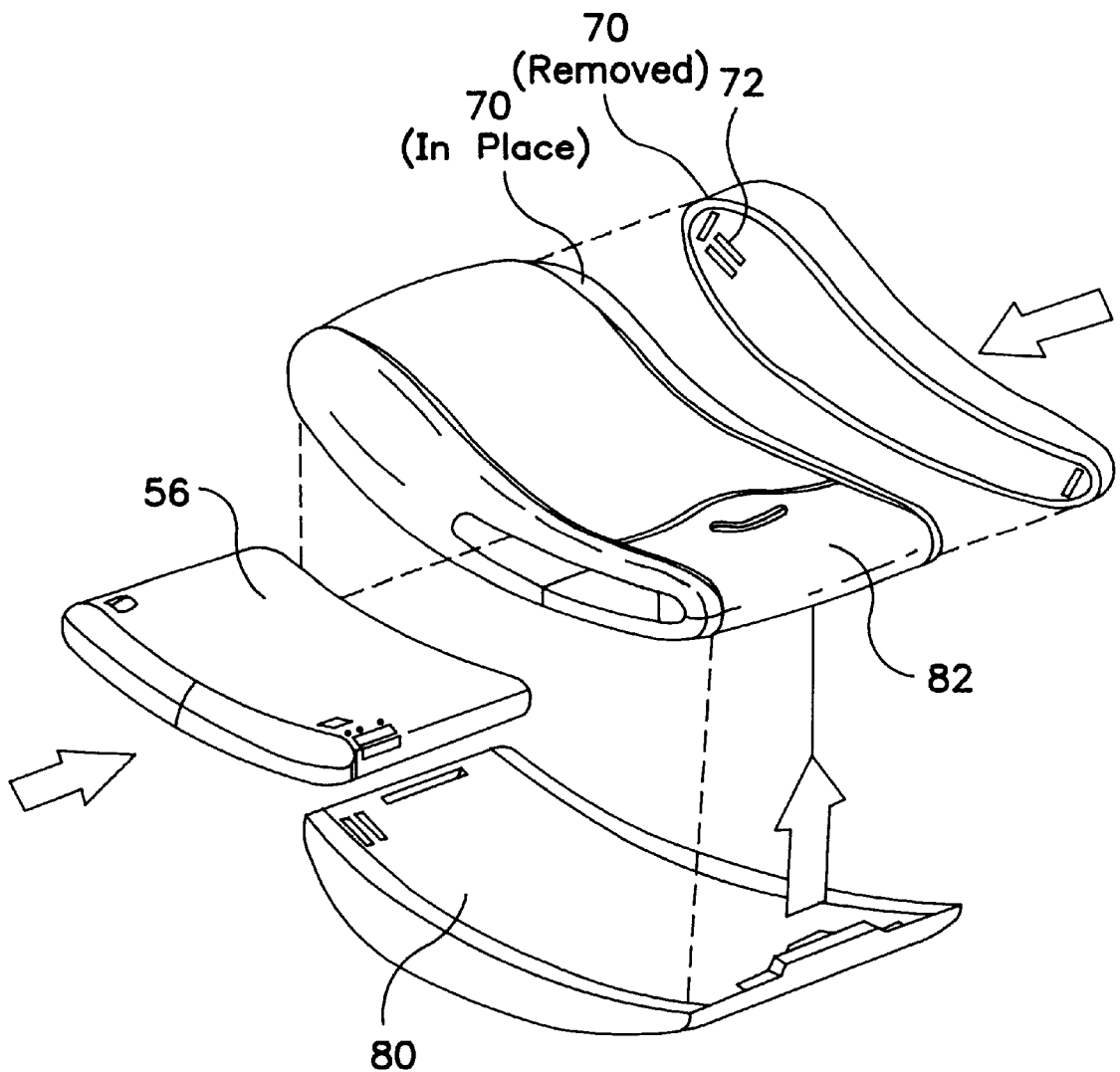
FIG. 8 is a perspective view of a telephone handset construction according to another alternative embodiment of the invention, demonstrating various optional configurations for the battery placement.

Since modem batteries can have virtually any shape and configuration which may be desired, a number of battery options can be used. FIG. 8, for example, shows two further options in addition to the internally carried battery. For example, the side closure 70 may house the battery, if provided with suitable electrical contacts 72, which will mate with corresponding contacts on the side of the main body portion 74. Alternatively, a snap-on battery (not shown) may be configured to snap on to and cover contacts on the surface of one or the other of the side closures. Another battery option is to have the battery (80) snap on to the bottom or outer surface of the rigid portion of the tambour 82 (shown closed in FIG. 8). By providing the outer surface of the tambour with the requisite electrical contacts and engagement structures, which will be able to releasably engage complementary engagement structures on the battery, the battery may be carried along the rigid portion of the movable tambour. Sliding electrical contacts between the tambour and the main body portion, or the use of a flexible connector ribbon, may be used to complete the electrical connection through to the main body portion.

There are several potential options available for the controls/display with which the telephone structure of the present invention may be provided. For example, the main body portion may be provided with an LCD display and a conventional keypad (shown in broken lines, ref. nos. 31, 32, FIG. 1). While the curved portion of the rigid portion of the tambour may be provided with a depression, mock grooves or apertures simulating a microphone cover (see region 36 in FIG. 1), in one embodiment of the invention, both the earpiece and the microphone (ref. nos. 33, 34, respectively, FIG. 5) will reside in the main body portion 13, the microphone being typically positioned at a lower or bottom edge region of the main body portion 13. As previously indicated, the portion of tambour 23 need not be curved nor rigid and the microphone need not be simulated but instead may be functional.

Depending upon the specific cellular telephone system and/or the level of programming sophistication built into the phone, it may be desirable to enable the phone to operate with so-called "smart cards", which are currently in use with GSM cellular telephone systems. Accordingly, one or more slots may be provided in the handset, to receive the card, and enable it to contact the corresponding electrical contacts within main body portion of the handset. FIG. 7 illustrates one possible location for the slot 86 for receiving a smart card 88, situated at the bottom of the main body portion of the handset. Such a slot might be accessible only if the tambour is in the open position. Alternatively, another slot, aligned with the first, may be located in the rigid portion of the tambour, so that the card can be inserted or removed, without opening the handset. In a still further alternative configuration, an aligned pair of slots may be provided in the main body portion and one or the other of the side closures, to enable inserting receipt and removal of a smart card through the side of the handset.

In order to convey information to the user when the cover is in its closed position, certain displays, such as power on, battery status, paging functions, and any other functions which can be addressed by a simple LED or by a multi-color LED (red to green for charging) may be accommodated by placing the requisite indicators (accompanied by any suitable indicia) on the side closures, as shown by reference numerals 90, 92, 94 in FIG. 7. The necessary electrical contacts can be positioned on the inner surfaces of the side closures, to engage and connect with corresponding contacts on the side surfaces of the main body portion, in a manner known to those of ordinary skill in the art.

Alternatively, one or more regions of the tambour may be manufactured of a clear or translucent material, to enable conventionally disposed status indicating LEDs and main display and the like, positioned on the front face of the main body portion, to be directly viewed through the closed tambour.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

What is claimed is:

1. A housing for a telephone comprising:

a main body portion for substantially containing the electronic functional components of the telephone housing, the main body portion having a longitudinal axis, front and back regions extending substantially parallel to the longitudinal axis, a top region, a bottom region substantially connecting the front and back regions, and two opposed side regions;

an articulable cover member, articulable from a closed configuration to an open configuration, relative to the main body region, the cover member being operably configured to substantially surround and cover the front and back regions and the top and bottom regions, when the cover member is in its closed configuration, the cover member being operably configured to move, at least in part, along a nonlinear path during said articulation, which substantially follows the profile contour of the main body portion;

one or more guide members, operably associated with the main body portion, for guiding the path of movement of the articulable cover member, during said articulation.

2. The housing for a telephone according to claim 1, further comprising one or more side closure members, operably positioned in overlying relationship to one or more of the side faces of the main body portion, wherein the one or more guide members are disposed in the one or more side closure members.

3. The housing for a telephone according to claim 1, wherein the cover member has a flexible portion and a substantially rigid portion, so that upon said articulation, to said open configuration, the flexible portion of the cover member changes its contour as it moves along the path of movement, to substantially conform to the contour of the main body portion, and wherein, upon said articulation to said open configuration, said substantially rigid portion extends substantially away from said main body portion.

4. The housing for a telephone according to claim 1, further comprising a drive mechanism which upon actuation serves to move the articulatable cover member from an open configuration to a closed configuration, relative to the main body region.

5. The housing for a telephone according to claim 4, wherein the drive mechanism comprises a coil spring.

6. The housing for a telephone according to claim 4, wherein the drive mechanism comprises an electric motor.

* * * * *

UNITED STATES PATENT AND TRADEMARK OFFICE
CERTIFICATE OF CORRECTION

PATENT NO.    : 6,201,868 B1  Page 1 of 1
DATED         : March 13, 2001
INVENTOR(S)   : Murphy et al.

It is certified that error appears in the above-identified patent and that said Letters Patent is hereby corrected as shown below:

<u>Title page,</u>
FOREIGN PRIORITY DATA, delete "9810177" and insert -- 9810177.7 --

Signed and Sealed this

Ninth Day of July, 2002

Attest:

Attesting Officer

JAMES E. ROGAN
*Director of the United States Patent and Trademark Office*